United States Patent

Carroll et al.

(10) Patent No.: US 10,280,092 B2
(45) Date of Patent: May 7, 2019

(54) OXIDES FOR HIGH ENERGY CATHODE MATERIALS

(71) Applicants: Kyler Carroll, Cardiff, CA (US); Bin Li, San Diego, CA (US)

(72) Inventors: Kyler Carroll, Cardiff, CA (US); Bin Li, San Diego, CA (US)

(73) Assignee: Wildcat Discovery Technologies, Inc, San Diego, CA (US)

( * ) Notice: Subject to any disclaimer, the term of this patent is extended or adjusted under 35 U.S.C. 154(b) by 0 days.

(21) Appl. No.: 15/222,377

(22) Filed: Jul. 28, 2016

(65) Prior Publication Data

US 2018/0034042 A1 Feb. 1, 2018

(51) Int. Cl.
| | |
|---|---|
| *C01G 45/12* | (2006.01) |
| *H01M 4/485* | (2010.01) |
| *H01M 4/505* | (2010.01) |
| *H01M 4/525* | (2010.01) |
| *H01M 10/0525* | (2010.01) |

(52) U.S. Cl.
CPC ........ *C01G 45/1228* (2013.01); *H01M 4/485* (2013.01); *H01M 4/505* (2013.01); *H01M 4/525* (2013.01); *C01P 2002/50* (2013.01); *C01P 2002/52* (2013.01); *C01P 2002/72* (2013.01); *H01M 10/0525* (2013.01)

(58) Field of Classification Search
CPC .................................................. H01M 4/1315
See application file for complete search history.

(56) References Cited

U.S. PATENT DOCUMENTS

| | | | |
|---|---|---|---|
| 2010/0086854 A1* | 4/2010 | Kumar | H01M 4/505 429/223 |
| 2014/0099549 A1 | 4/2014 | Ceder et al. | |
| 2014/0099579 A1 | 4/2014 | Takagi et al. | |
| 2016/0049640 A1 | 2/2016 | Takeuchi et al. | |
| 2017/0244104 A1* | 8/2017 | Natsui | C01G 45/1228 |

FOREIGN PATENT DOCUMENTS

EP 2980893 A1 2/2016

OTHER PUBLICATIONS

Lee et al. "Unlocking the Potential of Cation-Disordered Oxides for Rechargeable Lithium Batteries" Science, Jan. 31, 2014, vol. 343, pp. 519-522.*
Wang, Rui et al., "A disordered rock-salt Li-excess cathode material with high capacity and substantial oxygen redox activity: Li1.25Nb0.25Mn0.5O2", Electrochemistry Communications 60 (2015) 70-73.
Yabuuchi, Naoaki et al., "High-capacity electrode materials for rechargeable lithium batteries: Li3NbO4-based system with cation-disordered rocksalt structure", PNAS, Jun. 23, 2015, vol. 112, No. 25, pp. 7650-7655.
International Search Report & Written Opinion dated Dec. 26, 2017 in International application No. PCT/US2017/044364.
Ren, Shuhua et al., "Improved voltage and cycling for Li+ intercalation in high-capacity disordered oxyfluoride cathodes", Adv. Sci., 2015, vol. 2, Article No. 1500128, pp. 1-6.

* cited by examiner

*Primary Examiner* — Peter F Godenschwager

(74) *Attorney, Agent, or Firm* — Corridor Law Group, P.C.

(57) ABSTRACT

A disorder rock salt composition for use as a cathode active material. The stoichiometry of the lithium, niobium, oxygen, and transition metal components of the disordered rock salt is varied to improved performance in an electrochemical cell while substantially maintaining the disordered rock salt crystallographic structure.

16 Claims, 7 Drawing Sheets

OXIDES FOR HIGH ENERGY CATHODE MATERIALS

BACKGROUND OF THE INVENTION

The present invention is in the field of battery technology and, more particularly, in the area of high-energy materials for use in electrodes in electrochemical cells.

Lithium metal oxides have been used to formulate cathode materials for lithium ion batteries. The cathodes are derived from a few basic crystallographic structure types, such as spinels, olivines, and layered oxide structures. The layered oxide structures have included lithium-excess type structures, where additional lithium is present in the structure.

Recently, attention has been focused on rock salt structures, such as those formed from particular lithium metal oxides. Compounds represented by the formula:

$$x\text{Li}_3\text{NbO}_4 \cdot (1-x)\text{LiMO}_2 \qquad (1)$$

where M is a trivalent cation, have been shown to be a promising class of transition metal oxides for use as cathodes in lithium ion batteries. The compounds of formula (1) are considered a disordered rock salt in which a random atomic arrangement of lithium and transition metal ions are packed in a cubic closed packed system. These disordered rock salt compositions offer the ability to contain up to 3 lithium atoms per formula unit, which is more than the conventional lithium-excess layered materials. Formula (1) can be transformed and represented as $\text{Li}_x\text{M}_y\text{N}_z\text{O}_w$.

The disordered rock salt structure has the following advantages and challenges when used as a lithium ion battery cathode material. Advantageously, the disordered rock salt structure has significantly higher theoretical energy density as compared to other state-of-the-art cathode materials. For example, certain disordered rock salt structure materials have a theoretical gravimetric energy density of about 1120 Wh/kg, while a $\text{LiMn}_2\text{O}_4$ active material has a theoretical gravimetric energy density of about 492 Wh/kg and a $\text{LiMn}_{1.5}\text{Ni}_{0.5}\text{O}_4$ has a theoretical gravimetric energy density of about 691 Wh/kg. This energy density is especially appealing when manganese is used as a major component, as the disordered rock salt structure achieves this higher energy density using the comparatively lower cost raw material of manganese. That is, compounds with comparable energy density use higher cost raw materials.

Included among the research on disordered rock salt for use in lithium ion batteries is Wang, R.; Li, X.; Liu, L.; Lee, J.; Seo, D.-H.; Bo, S.-H.; Urban, A.; Ceder, G. A Disordered Rock-Salt Li-Excess Cathode Material with High Capacity and Substantial Oxygen Redox Activity: $\text{Li}_{1.25}\text{Nb}_{0.25}\text{Mn}_{0.5}\text{O}_2$. *Electrochem. Commun.* 2015, 60, 70-73. In this publication, a disordered rock salt compound having the formula $\text{Li}_{1.25}\text{Nb}_{0.25}\text{Mn}_{0.5}\text{O}_2$ was synthesized and tested. This material demonstrated higher capacity than the theoretical capacity based on the $\text{Mn}^{3+}/\text{Mn}^{4+}$ redox reaction. This publication demonstrates the utility of the $\text{Li}_{1.25}\text{Nb}_{0.25}\text{Mn}_{0.5}\text{O}_2$ disordered rock salt. However, the embodiments disclosed herein provide variations in the disordered rock salt structure and composition that are not disclosed or suggested in this publication.

Another example of research on disordered rock salt for use in lithium ion batteries is Yabuuchi, N.; Takeuchi, M.; Nakayama, M.; Shiiba, H.; Ogawa, M.; Nakagawa, K.; Ohta, T.; Endo, D.; Ozaki, T.; Inamasu, T.; et al. High-Capacity Electrode Materials for Rechargeable Lithium Batteries: $\text{Li}_3\text{NbO}_4$-Based System with Cation-Disordered Rock Salt Structure. *Proc. Natl. Acad. Sci.* 2015, 112, 7650-7655. This publication discloses the performance of a few compositions of the formulas $\text{Li}_{1.3}\text{Nb}_{0.3}\text{Mn}_{0.4}\text{O}_2$, $\text{Li}_{1.3}\text{Nb}_{0.3}\text{Fe}_{0.4}\text{O}_2$, $\text{Li}_{1.3}\text{Nb}_{0.43}\text{Ni}_{0.27}\text{O}_2$, and $\text{Li}_{1.3}\text{Nb}_{0.43}\text{Co}_{0.27}\text{O}_2$. Thus, this publication demonstrates some performance attributes of the disordered rock salt compositions with some variation in the "3d" metal (as defined below), but does not disclose or suggest the variations in the disordered rock salt structure and composition of the embodiments disclosed herein.

Yet another example of research on disordered rock salt for use in lithium ion batteries is Ceder, G.; Lee, J.; Li, X.; Kim, S.; Hautier, G. High-Capacity Positive Electrode Active Material. US 2014/0099549, Apr. 10, 2014. This publication discloses a generic disordered rock salt composition of the $\text{Li}_x\text{M}_y\text{O}_2$ where $0.6 \leq y \leq 0.85$; $0 \leq x+y \leq 2$; and M is one or more of Al, Ti, V, Cr, Mn, Fe, Co, Ni, Cu, Zn, Zr, Nb, Mo, Ru, Sn, and Sb. However, the embodiments disclosed herein provide variations in the disordered rock salt structure and composition that are not disclosed or suggested in this publication.

Still another example of research on disordered rock salt for use in lithium ion batteries is Takeuchi, M.; Yabuuchi, N.; Komaba, S.; Endo, D. Active Material For Nonaqueous Electrolyte Electricity Storage Elements. US2016/049640, Feb. 18, 2016. This publication discloses a generic disordered rock salt composition of the $\text{Li}_{1+x}\text{Nb}_y\text{Me}_z\text{A}_p\text{O}_2$ where Me is a transition metal including Fe and/or Mn; $0.6 < x < 1$; $0 < y < 0.5$; $0.25 \leq z < 1$; A is an element other than Nb and Me; and $0 \leq p \leq 0.2$. However, the embodiments disclosed herein provide variations in the disordered rock salt structure and composition that are not disclosed or suggested in this publication.

Embodiments disclosed herein are capable of, and in certain cases have demonstrated, improved capacity, energy density, voltage fade, rate performance, and capacity retention as compared to known disordered rock salt compositions.

BRIEF SUMMARY OF THE INVENTION

Embodiments of the invention include active material for use in a lithium ion battery. In some embodiments, the active material is characterized by a disordered rock salt crystallographic structure and represented by the chemical formula (i):

$$\text{Li}_x\text{Nb}_{y-a}\text{N}_a\text{M}_{z-b}\text{P}_b\text{O}_{2-c}\text{F}_c \qquad (i)$$

where $1.2 < x \leq 1.75$; $0 \leq y < 0.55$; $0.1 < z < 1$; $0 \leq a < 0.5$; $0 \leq b < 1$; $0 \leq c < 0.8$; M, N, and P are each independently one or more of Ti, Ta, V, Cr, Mn, Fe, Co, Ni, Cu, Zn, Al, Zr, Y, Mo, Ru, Rh, and Sb.

Embodiments of the invention include batteries having an electrode formed from any of the active materials disclosed above. Embodiments of the invention include processes for making the active materials disclosed above as described herein.

DETAILED DESCRIPTION OF THE INVENTION

Figure 1A:
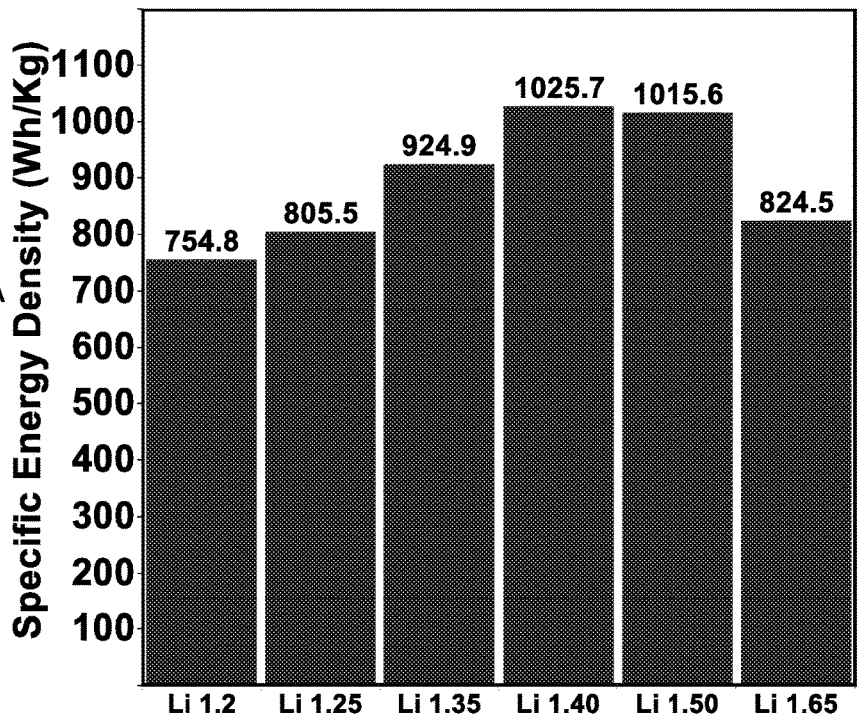
FIG. 1A illustrates electrochemical characterization of batteries including certain embodiments of the invention, where an improvement in energy density is shown as a result of increasing the lithium content.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "3d element" refers to a transition metal with incomplete filling of the 3d subshell of the M shell, and includes Sc, Ti, V, Cr, Mn, Fe, Co, Ni, Cu and Zn.

The term "4d element" refers to a transition metal with incomplete filling of the 4d subshell of the N shell, and includes Y, Zr, Nb, Mo, Tc, Ru, and Rh.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 30 degrees C., unless the context clearly dictates otherwise.

Ranges presented herein are inclusive of their endpoints. Thus, for example, the range 1 to 3 includes the values 1 and 3 as well as the intermediate values.

Embodiments of the present invention provide disordered rock salt compositions for use in formulating the cathodes of an electrochemical cell. As compared to the prior art disordered rock salt compositions, cathodes formed from certain embodiments of disordered rock salt disclosed herein yield improvements in the electrochemical performance of lithium ion batteries. Embodiments disclosed herein are capable of, and in certain cases have demonstrated, improved capacity, energy density, voltage fade, rate performance, and capacity retention. The compositions disclosed herein demonstrate superior performance compared to the base disordered rock salt composition.

In a disordered rock salt composition, both lithium and a transition metal occupy a cubic close-packed lattice of octahedral sites. In electrochemical reactions, lithium diffusion proceeds by the lithium hopping from one octahedral site to another octahedral site via an intermediate tetrahedral site. Lithium in the intermediate tetrahedral site is the activated state in lithium diffusion. The activated tetrahedral lithium ion shares faces with four octahedral sites as follows: (i) the site previously occupied by the lithium ion itself; (ii) the vacancy the lithium ion will move into; and (iii & iv) two sites that can be occupied by lithium, a transition metal, or a vacancy.

According to certain embodiments of the invention, varying and controlling the lithium content in the disordered rock salt leads to improved electrochemical performance in lithium ion battery cells having cathodes formed from compositions of these certain embodiments. The prior art disordered rock salt materials typically use stoichiometric lithium content of 1.4 or less, and more preferably about 1.25 or 1.3. In contrast, certain embodiments of the invention include disordered rock salt compositions where the lithium is present at a higher stoichiometric content than typical.

In certain preferred embodiments, the stoichiometric amount of lithium is greater than or equal to 1.20, greater than or equal to 1.25, greater than or equal to 1.30, greater than or equal to 1.35, greater than or equal to 1.40, greater than or equal to 1.45, greater than or equal to 1.50, greater than or equal to 1.55, greater than or equal to 1.60, greater than or equal to 1.65, greater than or equal to 1.70, or greater than or equal to 1.75.

In such embodiments, the stoichiometric content of another element in the disordered rock salt composition is decreased to compensate for the net charge difference caused by increasing the lithium content. The relationship between the increased lithium and the decreased element is captured in the exemplary formula:

$$Li_{1+x}Nb_{0.2}Me_zO_2 \quad (2)$$

where $0.1 < x \leq 1.95$, $0.01 \leq z \leq 1$, and M is an element that charge compensates the increase in lithium. Typically, this charge-balancing element will be a 3d or 4d element and can be Ti, V, Cr, Mn, Fe, Co, Ni, Cu, Zn, Al, Zr, Y, Mo, Ru, or Rh. Preferably, the element is Mn. A more general formula for the relationship in the stoichiometric amount of the elements in these embodiments is:

$$Li_xNb_yM_zO_2 \quad (3)$$

where $1.2 < x \leq 1.75$, $0.01 \leq y \leq 0.55$, $0.01 \leq z \leq 1$, and M is Ti, V, Cr, Mn, Fe, Co, Ni, Cu, Zn, Al, Zr, Y, Mo, Ru, or Rh.

Table 1 illustrates a larger range of stoichiometric amounts of lithium, niobium, and the amount of M used to compensate for the charge difference due to the increase in lithium content.

TABLE 1

Charge Compensating for Various Amounts of Lithium

| Li/Nb | 0 | 0.05 | 0.1 | 0.15 | 0.2 | 0.25 | 0.3 | 0.35 | 0.4 | 0.45 | 0.5 | 0.55 |
|---|---|---|---|---|---|---|---|---|---|---|---|---|
| 1 | 1 | 0.916667 | 0.&33333 | 0.75 | 0.666667 | 0.583333 | 0.5 | 0.416667 | 0333333 | 0.25 | 0.166667 | 0.083333 |
| 1.05 | 0.983333 | 0.9 | 0.816667 | 0.733333 | 0.65 | 0.566667 | 0.483333 | 0.4 | 0.316667 | 0.233333 | 0.15 | 0.066667 |
| 1.1 | 0.966667 | 0.883333 | 0.8 | 0.716667 | 0.633333 | 0.55 | 0.4 66667 | 0.383333 | 0.3 | 0.216667 | 0.133333 | 0.05 |
| 1.15 | 0.95 | 0.866667 | 0.783333 | 0.7 | 0.616667 | 0.533333 | 0.45 | 0.366667 | 0.283333 | 0.2 | 0.116667 | 0.033333 |
| 1.2 | 0.933333 | 0.85 | 0.766667 | 0.683333 | 0.6 | 0.516667 | 0.433333 | 0.35 | 0.266667 | 0.183333 | 0.1 | 0.016667 |
| 1.25 | 0.916667 | 0.833333 | 0.75 | 0.666667 | 0.583333 | 0.5 | 0.416667 | 0.333333 | 0.25 | 0.166667 | 0.083333 | 0 |
| 1.3 | 0.9 | 0.816667 | 0.733333 | 0.65 | 0.566667 | 0.483333 | 0.4 | 0.316667 | 0.233333 | 0.15 | 0.066667 | 0 |
| 1.35 | 0.883333 | 0.8 | 0.715667 | 0.633333 | 0.55 | 0.466667 | 0.383333 | 0.3 | 0.216667 | 0.133333 | 0.05 | 0 |
| 1.4 | 0.866667 | 0.783333 | 0.7 | 0.616667 | 0.533333 | 0.45 | 0.366667 | 0.283333 | 0.2 | 0.116667 | 0.033333 | 0 |
| 1.45 | 0.85 | 0.766667 | 0.683333 | 0.6 | 0.516667 | 0.433333 | 0.35 | 0.266667 | 0.183333 | 0.1 | 0.016667 | 0 |
| 1.5 | 0.833333 | 0.75 | 0.666667 | 0.583333 | 0.5 | 0.416667 | 0.333333 | 0.25 | 0.166667 | 0.083 333 | 0 | 0 |
| 1.55 | 0.816667 | 0.733333 | 0.65 | 0.566667 | 0.483333 | 0.4 | 0.316667 | 0.233333 | 0.15 | 0.066667 | 0 | 0 |
| 1.6 | 0.8 | 0.716667 | 0.633333 | 0.55 | 0.466667 | 0.383333 | 0.3 | 0.216667 | 0.133333 | 0.05 | 0 | 0 |
| 1.65 | 0.783333 | 0.7 | 0.616667 | 0.533333 | 0.45 | 0.366667 | 0.283333 | 0.2 | 0.116667 | 0.033333 | 0 | 0 |
| 1.7 | 0.766667 | 0.683333 | 0.6 | 0.516667 | 0.433333 | 0.35 | 0.266667 | 0.183333 | 0.1 | 0.016667 | 0 | 0 |
| 1.75 | 0.75 | 0.666667 | 0.583333 | 0.5 | 0.416667 | 0333333 | 0.25 | 0.166667 | 0.083333 | 0 | 0 | 0 |
| 1.8 | 0.733333 | 0.65 | 0.566667 | 0.483333 | 0.4 | 0.316667 | 0.233333 | 0.15 | 0.066667 | 0 | 0 | 0 |
| 1.85 | 0.716667 | 0.633333 | 0.55 | 0.466667 | 0.383333 | 0.3 | 0.216667 | 0.133333 | 0.05 | 0 | 0 | 0 |
| 1.9 | 0.7 | 0.616667 | 0.533333 | 0.45 | 0.366667 | 0.283333 | 0.2 | 0.116667 | 0.033333 | 0 | 0 | 0 |
| 1.95 | 0.683333 | 0.6 | 0.516667 | 0.433333 | 0.35 | 0.266667 | 0.183333 | 0.1 | 0.016667 | 0 | 0 | 0 |
| 2 | 0.666667 | 0.583333 | 0.5 | 0.416667 | 0.333333 | 0.25 | 0.166667 | 0.083333 | 0 | 0 | 0 | 0 |
| 2.05 | 0.65 | 0.566667 | 0.483333 | 0.4 | 0.316667 | 0.233333 | 0.15 | 0.066667 | 0 | 0 | 0 | 0 |
| 2.1 | 0.633333 | 0.55 | 0.466667 | 0.383333 | 0.3 | 0.216667 | 0.133333 | 0.05 | 0 | 0 | 0 | 0 |
| 2.15 | 0.616667 | 0.533333 | 0.45 | 0.366667 | 0.283333 | 0.2 | 0.116667 | 0.033333 | 0 | 0 | 0 | 0 |
| 2.2 | 0.6 | 0.516667 | 0.433333 | 0.35 | 0.266667 | 0.183333 | 0.1 | 0.016667 | 0 | 0 | 0 | 0 |
| 2.25 | 0.583333 | 0.5 | 0.416667 | 0.333333 | 0.25 | 0.166667 | 0.083333 | 0 | 0 | 0 | 0 | 0 |
| 2.3 | 0.566667 | 0.483333 | 0.4 | 0.316667 | 0.233333 | 0.15 | 0.066667 | 0 | 0 | 0 | 0 | 0 |
| 2.35 | 0.55 | 0.466667 | 0.383333 | 0.3 | 0.216667 | 0.133333 | 0.05 | 0 | 0 | 0 | 0 | 0 |
| 2.4 | 0.533333 | 0.45 | 0.366667 | 0.283333 | 0.2 | 0.116667 | 0.033333 | 0 | 0 | 0 | 0 | 0 |
| 2.45 | 0.516667 | 0.433333 | 0.35 | 0.266667 | 0.183333 | 0.1 | 0.016667 | 0 | 0 | 0 | 0 | 0 |
| 2.5 | 0.5 | 0.416667 | 0.333333 | 0.25 | 0.166667 | 0.083333 | 0 | 0 | 0 | 0 | 0 | 0 |
| 2.55 | 0.483333 | 0.4 | 0.316667 | 0.233333 | 0.15 | 0.066667 | 0 | 0 | 0 | 0 | 0 | 0 |
| 2.6 | 0.466667 | 0.383333 | 0.3 | 0.216667 | 0.133333 | 0.05 | 0 | 0 | 0 | 0 | 0 | 0 |
| 2.65 | 0.45 | 0.366667 | 0.283333 | 0.2 | 0.116667 | 0.033333 | 0 | 0 | 0 | 0 | 0 | 0 |
| 2.7 | 0.433333 | 0.35 | 0.266667 | 0.183333 | 0.1 | 0.016667 | 0 | 0 | 0 | 0 | 0 | 0 |
| 2.75 | 0.416667 | 0.333333 | 0.25 | 0.166667 | 0.083333 | 0 | 0 | 0 | 0 | 0 | 0 | 0 |
| 2.8 | 0.4 | 0.316667 | 0.233333 | 0.15 | 0.066667 | 0 | 0 | 0 | 0 | 0 | 0 | 0 |
| 2.85 | 0.383333 | 0.3 | 0.216667 | 0.133333 | 0.05 | 0 | 0 | 0 | 0 | 0 | 0 | 0 |
| 2.9 | 0.366667 | 0.283333 | 0.2 | 0.116667 | 0.033333 | 0 | 0 | 0 | 0 | 0 | 0 | 0 |
| 2.95 | 0.35 | 0.266667 | 0.183333 | 0.1 | 0.016667 | 0 | 0 | 0 | 0 | 0 | 0 | 0 |
| 3 | 0.333333 | 0.25 | 0.166667 | 0.083333 | 0 | 0 | 0 | 0 | 0 | 0 | 0 | 0 |
| 3.05 | 0.316667 | 0.23333 | 0.15 | 0.066667 | 0 | 0 | 0 | 0 | 0 | 0 | 0 | 0 |
| 3.1 | 0.3 | 0.216667 | 0.133333 | 0.05 | 0 | 0 | 0 | 0 | 0 | 0 | 0 | 0 |
| 3.15 | 0.283333 | 0.2 | 0.116667 | 0.033333 | 0 | 0 | 0 | 0 | 0 | 0 | 0 | 0 |
| 3.2 | 0.266667 | 0.183333 | 0.1 | 0.016667 | 0 | 0 | 0 | 0 | 0 | 0 | 0 | 0 |
| 3.25 | 0.25 | 0.166667 | 0.083333 | 0 | 0 | 0 | 0 | 0 | 0 | 0 | 0 | 0 |
| 3.3 | 0.233333 | 0.15 | 0.066667 | 0 | 0 | 0 | 0 | 0 | 0 | 0 | 0 | 0 |
| 3.35 | 0.216667 | 0.133333 | 0.05 | 0 | 0 | 0 | 0 | 0 | 0 | 0 | 0 | 0 |
| 3.4 | 0.2 | 0.116667 | 0.033333 | 0 | 0 | 0 | 0 | 0 | 0 | 0 | 0 | 0 |
| 3.45 | 0.183333 | 0.1 | 0.016667 | 0 | 0 | 0 | 0 | 0 | 0 | 0 | 0 | 0 |
| 3.5 | 0.166667 | 0.083333 | 0 | 0 | 0 | 0 | 0 | 0 | 0 | 0 | 0 | 0 |
| 3.55 | 0.15 | 0.066667 | 0 | 0 | 0 | 0 | 0 | 0 | 0 | 0 | 0 | 0 |
| 3.6 | 0.133333 | 0.05 | 0 | 0 | 0 | 0 | 0 | 0 | 0 | 0 | 0 | 0 |

TABLE 1-continued

Charge Compensating for Various Amounts of Lithium

| Li/Nb | 0 | 0.05 | 0.1 | 0.15 | 0.2 | 0.25 | 0.3 | 0.35 | 0.4 | 0.45 | 0.5 | 0.55 |
|---|---|---|---|---|---|---|---|---|---|---|---|---|
| 3.65 | 0.116667 | 0.033333 | 0 | 0 | 0 | 0 | 0 | 0 | 0 | 0 | 0 | 0 |
| 3.7 | 0.1 | 0.016667 | 0 | 0 | 0 | 0 | 0 | 0 | 0 | 0 | 0 | 0 |

The vertical axis of Table 1 lists the stoichiometric amount of lithium present in Formula 3 and the horizontal axis lists the stoichiometric amount of niobium present in Formula 3. The data in Table 1 is the stoichiometric amount of M (in this case, manganese) that is used to charge compensate for these various stoichiometric amounts of lithium. Thus, Table 1 lists a ranges for Formula 3 as follows: $1.0 \leq x \leq 3.7$, $0.00 \leq y \leq 0.55$, $0.017 \leq z \leq 1$. These ranges included the preferred embodiments of the invention as well as other embodiments of the invention.

In the results presented herein, embodiments of the invention with increased stoichiometric amounts of lithium are shown to improve the electrochemical performance of the disordered rock salt compositions. In contrast to the prior art, the embodiments of the present invention increase the stoichiometric amount of lithium while charge-compensating the disordered rock salt composition. The specific relationship among the constituent elements of the disordered rock salt compositions is at least one way the present embodiments are distinct from the prior art. Without being bound to any particular theory or mechanism of action, varying the 4d to 3d ratio can trap an O2 dimer such that the amount of oxygen released from the structure is significantly less than in conventional disordered rock salt. This mechanism is related to reductive coupling that can occur in certain 4d to 3d ratios.

According to certain embodiments of the invention, varying and controlling the ratio of the various cations in the disordered rock salt leads to improved electrochemical performance in lithium ion battery cells having cathodes formed from compositions of these certain embodiments. To the extent the prior art specifies and/or prefers a ratio among the various cations in the prior art disordered rock salt compositions, the ratio is typically 2.0, derived from 3d/4d. That is, the 3d element is present at stoichiometric amount twice that of the 4d element.

A general formula for the relationship in the stoichiometric amounts of the 3d and 4d elements in these embodiments is:

$$Li_{1+x}M4d_yM3d_zO_2 \quad (4)$$

where $0.2 < x \leq 0.75$, $0 < y \leq 0.55$, $1 \leq z/y \leq 18$, M4d is a 4d element, and M3d is a 3d element. In certain preferred embodiments, the ratio z/y is greater than 2 and in other preferred is greater than or equal to 10. In certain preferred embodiments, M4d is niobium and M3d is manganese.

In certain embodiments, the stoichiometric ratio of the 3d element to the 4d element is at least 2.0, at least 2.5, at least 3.0, at least 3.5, at least 4.0, at least 4.5, at least 5.0, at least 5.5, at least 6.0, at least 6.5, at least 7.0, at least 7.5, at least 8.0, at least 8.5, at least 9.0, at least 9.5, at least 10.0, at least 10.5, at least 11.0, at least 11.5, at least 12.0, at least 12.5, at least 13.0, at least 13.5, at least 14.0, at least 14.5, at least 15.0, at least 15.5, at least 16.0, at least 16.5, at least 17.0, at least 17.5, or at least 18.0.

In the results presented herein, embodiments of the invention with comparatively higher ratio between the stoichiometric amounts of the 3d elements and the 4d elements are shown to improve the electrochemical performance of the disordered rock salt compositions. In contrast to the prior art, the embodiments of the present invention demonstrate the utility of a specific ratio between the stoichiometric amounts of the 3d elements and the 4d elements in the disordered rock salt compositions, and this ratio is at least one way the present embodiments are distinct from the prior art.

According to certain embodiments of the invention, varying and controlling the content of dopants at 3d element and 4d element sites in the disordered rock salt leads to improved electrochemical performance in lithium ion battery cells having cathodes formed from compositions of these certain embodiments. The prior art disordered rock salt materials typically do not contain dopants at any of the 3d or 4d sites. In certain embodiments, the preferred 4d element is niobium and the preferred 3d element manganese. The doped synthesis of the disordered rock salt can be accomplished by solid state reaction.

A general formula for a composition demonstrating the doping at the sites of the 3d and 4d elements, where manganese has been selected as a 3d element and niobium has been selected as a 4d element, in these embodiments is:

$$Li_xNb_{y-a}N_aM_{z-b}P_bO_2 \quad (5)$$

where $1.2 < x \leq 1.75$; $0.01 < y \leq 0.55$; $0.1 < z < 1$; $0 \leq a < 0.5$; $0 \leq b < 1$; M is one or more of Ti, V, Cr, Mn, Fe, Co, Ni, Cu, Zn, Al, Zr, Y, Mo, Ru, and Rh; N is one or more of V, Mo, Sb, Ta, Ti, Zr, and Y; and P is one or more of Fe, Cr, Al, and Sb.

In some preferred embodiments, one of a or b is equal to zero. That is, there is either a dopant at the niobium site or at the manganese site, but not at both sites. An example of a=0 is:

$$Li_{1.5}Nb_{0.05}Mn_{0.8-b}P_bO_2 \quad (6)$$

where $0 < b < 0.8$ and P is one or more of Fe, Cr, Al, and Sb. An example of b=0 is:

$$Li_{1.4}Nb_{0.2-a}N_aMn_{0.57}O_2 \quad (7)$$

where $0 < a < 0.2$ and N is one or more of V, Mo, Sb, Ta, Ti, Zr, and Y.

In the results presented herein, embodiments of the invention with dopants at 3d element or 4d element sites in the disordered rock salt are shown to improve the electrochemical performance of the disordered rock salt compositions. In contrast to the prior art, the embodiments of the present invention demonstrate the utility of dopants at 3d element or 4d element sites in the disordered rock salt, and the presence of these dopants is at least one way the present embodiments are distinct from the prior art. The dopants were found to improve one or more electrochemical performance metrics, such as energy density, rate performance, and capacity retention.

According to certain embodiments of the invention, varying and controlling the presence of niobium in the disordered rock salt leads to improved electrochemical performance in lithium ion battery cells having cathodes formed from compositions of these certain embodiments. The prior art disordered rock salt materials typically include niobium. In certain embodiments, the niobium is completely replaced with one or more other elements.

A general formula for compositions where the niobium is completely replaced according to these embodiments is:

$$Li_xM_yN_uMn_zO_2 \qquad (8)$$

where M and N are metals; $1.2 < x \leq 1.75$; $0 < y < 0.55$; $0 \leq u \leq 0.55$; and $0.2 < z < 1.0$ In certain preferred embodiments, M is selected from Ti, Ta, Zr, W, and Mo and N is independently selected from Ti, V, Cr, Fe, Co, Ni, Cu, Zn, Al, Zr, Y, Mo, Ru, and Sb. In certain preferred embodiments, there is a single dopant (that is, one of y or u is zero) and, in other preferred embodiments, there are two dopants.

In the results presented herein, embodiments of the invention with single dopants and double dopants that completely replace the niobium in the disordered rock salt are shown to improve the electrochemical performance of the disordered rock salt compositions. In contrast to the prior art, the embodiments of the present invention demonstrate the utility of completely replacing niobium in the disordered rock salt, and the absence of niobium is at least one way the present embodiments are distinct from the prior art. Similarly, particular 4d to 3d ratios can shift the stabilization of the $O_2$ dimer.

According to certain embodiments of the invention, varying and controlling the amount of oxygen in the disordered rock salt leads to improved electrochemical performance in lithium ion battery cells having cathodes formed from compositions of these certain embodiments. Specifically, doping fluorine into some of the oxygen sites leads to improved electrochemical performance.

The prior art disordered rock salt materials typically do not contain dopants at the oxygen sites, instead synthesizing materials into a target stoichiometric composition without including a doping step. Further, the disordered rock salt compositions of the prior art typically do not contain fluorine. Synthesis routes for a fluorine-substituted disordered rock salt are disclosed below.

A general formula for the doping at the oxygen sites in these embodiments is:

$$Li_xNb_{y-a}N_aM_{z-b}P_bO_{2-c}F_c \qquad (9)$$

where $1.2 < x \leq 1.75$; $0 \leq y \leq 0.55$; $0.1 < z < 1$; $0 \leq a < 0.5$; $0 \leq b < 1$; $0 < c < 0.8$; M, N, and P are each independently one or more of Ti, V, Cr, Mn, Fe, Co, Ni, Cu, Zn, Al, Zr, Y, Mo, Ru, and Rh.

In the results presented herein, embodiments of the invention with fluorine dopants at the oxygen site in the disordered rock salt are shown to improve the electrochemical performance of the disordered rock salt compositions. In contrast to the prior art, the embodiments of the present invention demonstrate the utility of dopants at the oxygen site in the disordered rock salt, and the presence of these dopants, in particular a fluorine dopant, is at least one way the present embodiments are distinct from the prior art.

Without being bound by a particular theory or mechanism of action, anionic substitution of fluorine for oxygen (forming a oxyfluoride) can enhance cycling performance by having a greater resistance to HF attack from electrolyte decomposition at high voltage. Alternatively, the higher iconicity in the metal-fluorine bond over that of the metal-oxygen bond can result in less transition metal leaching from the cathode to the electrolyte, further stabilizing the structure.

According to certain embodiments of the invention, varying and controlling the atmosphere in which the disordered rock salt composition is annealed leads to improved electrochemical performance in lithium ion battery cells having cathodes formed from compositions of these certain embodiments. Specifically, varying among argon gas flow, nitrogen gas flow, and air flow leads to improved electrochemical performance. Notably, the improvements yielded by the annealing environment depend on the starting composition and the dopant(s). Without being bound by a particular theory or mechanism of action, in an argon or nitrogen environment, the oxygen stoichiometry is retained, but in an air anneal, oxygen may be released, affecting the stoichiometry and leading to poorer electrochemical performance.

According to certain embodiments of the invention, varying and controlling the presence of various carbon precursors with which the disordered rock salt composition is milled leads to improved electrochemical performance in lithium ion battery cells having cathodes formed from compositions of these certain embodiments. Examples of carbon precursors include, but are not limited to, acetylene black, carbon black, carbon fiber, graphite, or KJ600). The precursor can be present from about 10 weight percent to about 40 weight percent of the cathode material.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Standard Synthesis.

Disordered rock salt materials were synthesized by a two-step method of milling and annealing. Typically, stoichiometric amounts of precursors (such as Mn2O3, Li2CO3, Nb2O5, and others) were milled. Then, the milled powder was annealed between about 900 and about 1000 degrees Celsius for from about 6 to about 12 hours under argon gas flow (about 19 L/min). In some cases, the annealing was conducted under nitrogen gas flow or air flow. Following the annealing step, the powder was again milled with a carbon precursor (such as acetylene black, carbon black, carbon fiber, graphite, or KJ600) in an 80:20 weight ratio (annealed powder:carbon).

No Nb Synthesis.

Disordered rock salt materials containing no Nb were synthesized by a two-step method of milling and annealing. Typically, stoichiometric amounts of precursors (such as $Mn_2O_3$, $Li_2CO_3$, and other 4d oxides ($Ta_2O_5$, $TiO_2$, $MoO_2$, $WO_3$) were milled. Then, the milled powder was annealed between about 900 degrees Celsius and about 1000 degrees Celsius for from about 6 to about 12 hours under argon gas flow (about 19 L/min). Following the annealing step, the powder was again milled with a carbon precursor (such as acetylene black, carbon black, carbon fiber, graphite, graphene, carbon single or double walled nanotubes, or KJ600) in an 80:20 weight ratio (annealed powder:carbon).

Fluorine-Doped Synthesis.

Disordered rock salt materials with fluorine doping (substitution) on the oxygen site were synthesized by a two-step method of milling and annealing. Typically, stoichiometric amounts of precursors (such as $Mn_2O_3$, $Li_2CO_3$, $Nb_2O_5$, and $NbF_5$ (or other fluoride precursors)) were milled. Then, the milled powder was annealed between about 900 degrees Celsius and about 1000 degrees Celsius for from about 6 to about 12 hours under argon gas flow (about 19 L/min).

Following the annealing step, the powder was again milled with a carbon precursor (such as acetylene black, carbon black, carbon fiber, graphite, graphene, carbon single or double walled nanotubes, or KJ600) in an 80:20 weight ratio (annealed powder:carbon).

Cell Assembly.

Battery cells were formed in a high purity argon filled glovebox (M-Braun, O2 and humidity content<0.1 ppm). The cathode was prepared by mixing the disordered rock salt powder with poly(vinylidene fluoride) (Sigma Aldrich) and 1-methyl-2-pyrrolidinone (Sigma Aldrich), and the resulting slurry was deposited on a stainless steel current collector and dried to form a composite cathode film. For the anode, a thin lithium foil was cut into the required size. Each battery cell included the composite cathode film, a polypropylene separator, and a lithium foil anode. An electrolyte containing lithium hexafluororophosphate in a mixture of ethylene carbonate and ethyl methyl carbonate with an additive was used. The battery cell was sealed and cycled between 1.5 V and 4.8V at 55 degrees Celsius or, in some cases, 30 degrees Celsius.

RESULTS

Figure 1B:
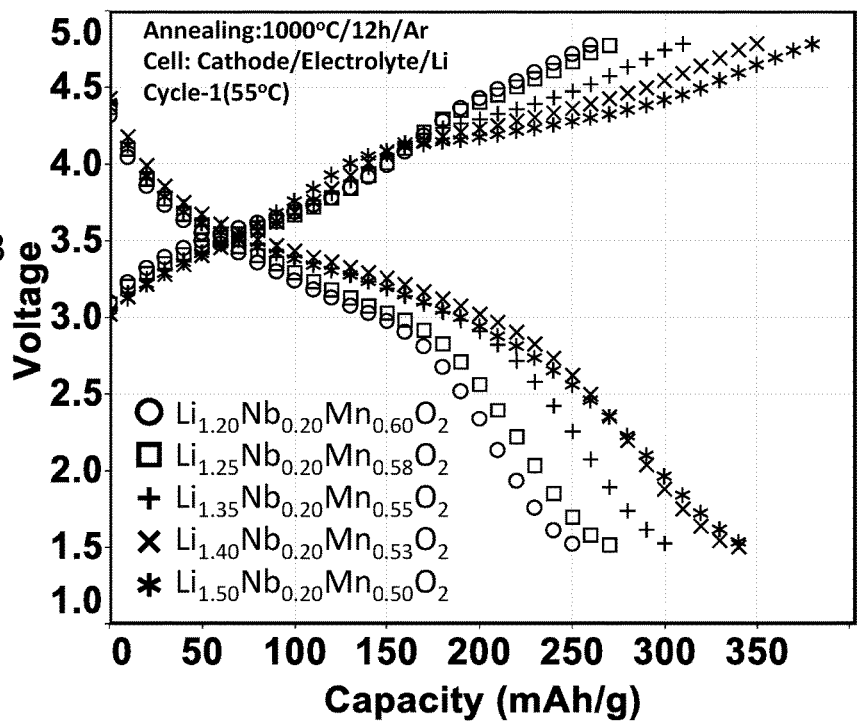
FIG. 1B illustrates a voltage trace for batteries including certain embodiments of the invention, where the stoichiometric lithium content is increased from 1.2 to 1.5 and the stoichiometric manganese content is decreased from 0.6 to 0.5.
Figure 1C:
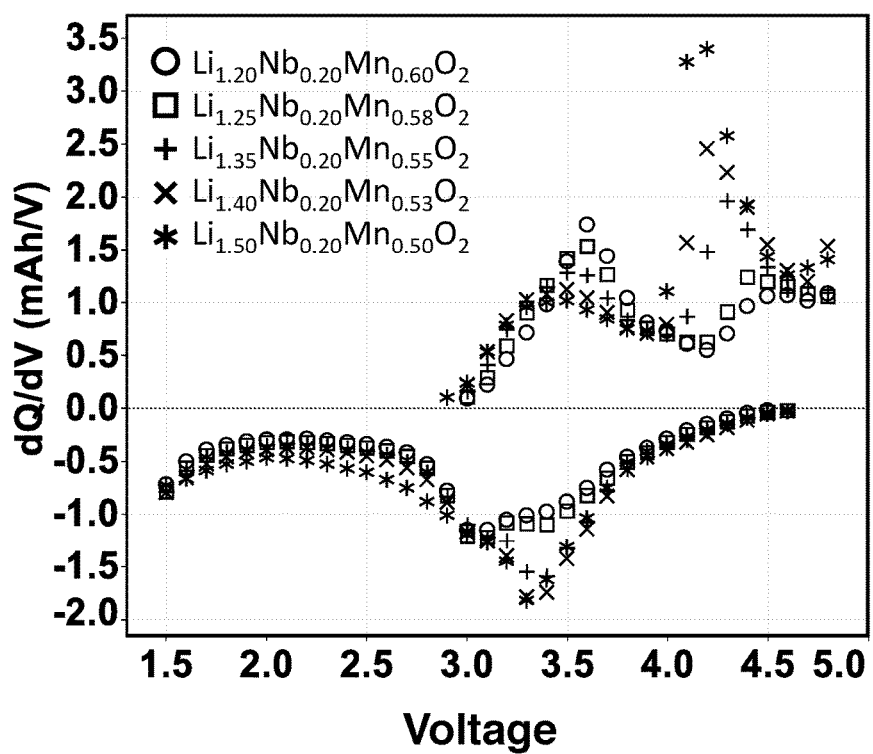
FIG. 1C illustrates the corresponding differential capacity as a function of voltage for the embodiments of the invention of FIG. 1B.

FIG. 1A illustrates electrochemical characterization of batteries including certain embodiments of the invention, where an improvement in energy density is shown as a result of increasing the lithium content. FIG. 1B illustrates a voltage trace for batteries including certain embodiments of the invention, where the stoichiometric lithium content is increased from 1.2 to 1.5 and the stoichiometric manganese content is decreased from 0.6 to 0.5. FIG. 1C illustrates the corresponding differential capacity as a function of voltage for the embodiments of the invention of FIG. 1B.

In FIG. 1A, the stoichiometric lithium content was increased, the stoichiometric niobium content was held constant, the stoichiometric manganese content was decreased to charge-compensate for the increasing lithium content, and the stoichiometric oxygen content was held constant. The various disordered rock salt compositions were $Li_{1.20}Nb_{0.20}Mn_{0.60}O_2$ (as control), $Li_{1.25}Nb_{0.20}Mn_{0.58}O_2$, $Li_{1.35}Nb_{0.20}Mn_{0.55}O_2$, $Li_{1.40}Nb_{0.20}Mn_{0.53}O_2$, $Li_{1.50}Nb_{0.20}Mn_{0.50}O_2$, and $Li_{1.65}Nb_{0.20}Mn_{0.45}O_2$.

FIG. 1B demonstrates improvement in first cycle capacity with increasing lithium content, while the content is balanced with decreasing manganese content. The highest stoichiometric lithium content provided approximately 36% improvement in first cycle charge capacity and approximately 40% improvement in first cycle discharge capacity.

Figure 2A:
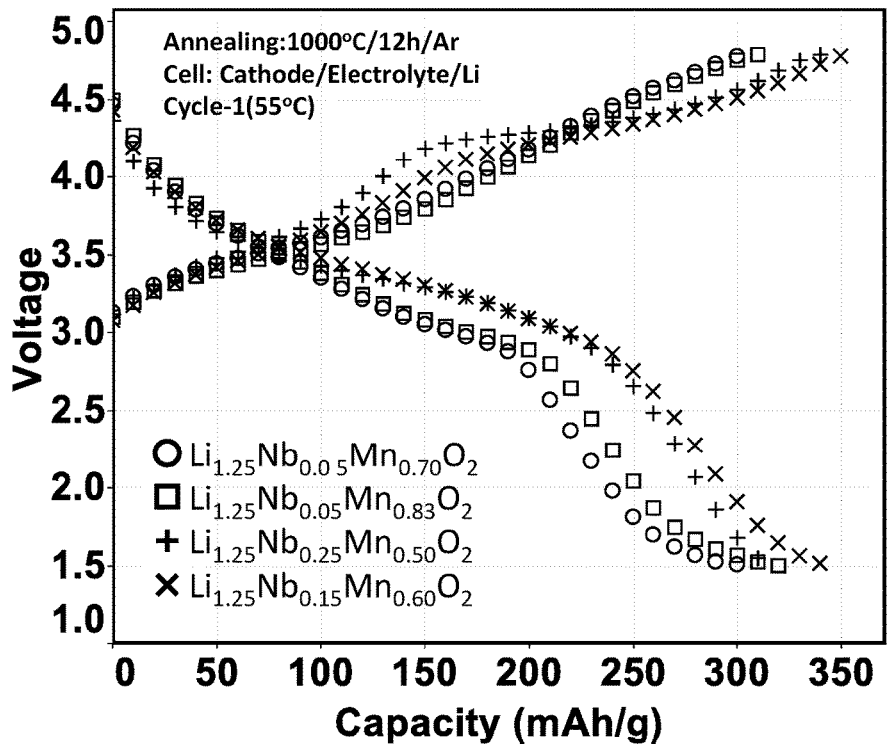
FIG. 2A illustrates a voltage trace for batteries including certain embodiments of the invention, where the ratio of niobium to manganese is systematically varied.
Figure 2B:
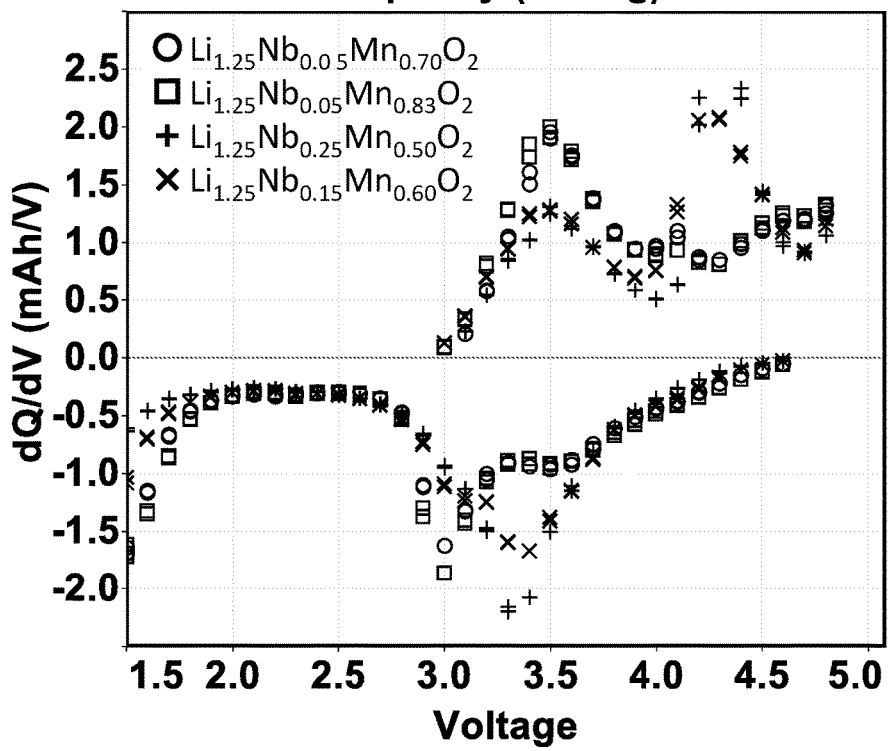
FIG. 2B illustrates the corresponding differential capacity as a function of voltage for the embodiments of the invention of FIG. 2A.

FIG. 2A illustrates a voltage trace for batteries including certain embodiments of the invention, where the ratio of niobium to manganese is systematically varied. FIG. 2B illustrates the corresponding differential capacity as a function of voltage for the embodiments of the invention of FIG. 2A.

FIG. 2A shows that higher 3d/4d ratios yield improvements in the electrochemical performance. The ratios in FIG. 2A are 2 (0.50/0.25); 4 (0.60/0.15); 14 (0.70/0.05); and 16.6 (0.83/0.05). The higher ratios provided approximately 17% improvement in first cycle discharge capacity.

Figure 3:
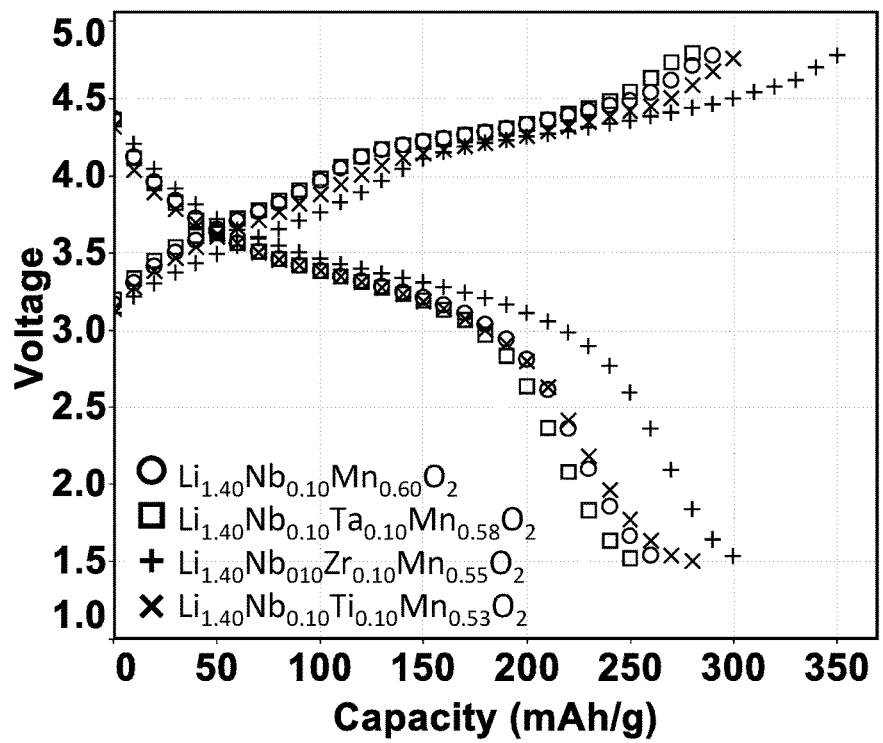
FIG. 3 illustrates a voltage trace for batteries including certain embodiments of the invention, where various transition metal dopants are doped onto the niobium site.

FIG. 3 illustrates a voltage trace for batteries including certain embodiments of the invention, where various transition metal dopants are doped onto the niobium site. Table 2 discloses the results of doping at the niobium site and the respective first cycle discharge capacity and specific energy density. These data were generated from cycling between 4.8 V and 1.5 V at a C-rate of C/40.

TABLE 2

Doping at the Niobium Site with Certain Dopants

| Structure | Dopant Quantity (x) | Dopant | Discharge Capacity (mAh/g) | Specific Energy Density (Wh/Kg) |
|---|---|---|---|---|
| $Li_{1.4}Nb_{0.2}Mn_{0.57}O_2$ | — | — | 242 | 769 |
| $Li_{1.4}Nb_{0.2-x}TM_xMn_{0.57}O_2$ | 0.05 | Ti | 288.49 | 911 |
|  | 0.1 |  | 308.6 | 979 |
|  | 0.15 |  | 273.9 | 860.8 |
| $Li_{1.4}Nb_{0.2-x}TM_xMn_{0.57}O_2$ | 0.05 | Zr | 284.54 | 884.6 |
|  | 0.1 |  | 275.5 | 839.9 |
|  | 0.15 |  | 205.5 | 740.3 |
| $Li_{1.4}Nb_{0.2-x}TM_xMn_{0.57}O_2$ | 0.05 | Sb | 246.6 | 745.8 |
| $Li_{1.4}Nb_{0.2-x}TM_xMn_{0.57}O_2$ | 0.05 | Mo | 266.86 | 822.7 |
|  | 0.1 |  | 241.6 | 731 |
| $Li_{1.4}Nb_{0.2-x}TM_xMn_{0.57}O_2$ | 0.05 | Y | 274.67 | 835.2 |
|  | 0.1 |  | 208.4 | 615 |
| $Li_{1.4}Nb_{0.2-x}TM_xMn_{0.57}O_2$ | 0.05 | Ta | 272.35 | 857 |
|  | 0.1 |  | 251.7 | 791 |
|  | 0.15 |  | 266.9 | 835.2 |
| $Li_{1.4}Nb_{0.2-x}TM_xMn_{0.57}O_2$ | 0.1 | W | 269.2 | 825.9 |
| $Li_{1.4}Nb_{0.2-x}TM_xMn_{0.57}O_2$ | 0.05 | V | 250.71 | 747.7 |
|  | 0.1 |  | 208.4 | 583.9 |

FIG. 3 illustrates the voltage traces for certain of the doped disordered rock salt compositions in Table 2. Many of the doped disordered rock salt compositions demonstrated performance superior to the undoped disordered rock salt compositions.

Table 3 discloses the results of doping at the manganese site and the respective first cycle discharge capacity and specific energy density. These data were generated from cycling between 4.8 V and 1.5 V at a C-rate of C/40.

TABLE 3

Doping at the Manganese Site with Certain Dopants

| Structure | Dopant Quantity (x) | Dopant | Discharge Capacity (mAh/g) | Specific Energy Density (Wh/Kg) |
|---|---|---|---|---|
| $Li_{1.5}Nb_{0.05}Mn_{0.8}O_2$ | — | — | 261 | 789 |
| $Li_{1.5}Nb_{0.05}Mn_{0.8-y}TM_yO_2$ | .05 | Fe | 314.9 | 976.7 |
|  | 0.2 |  | 165.56 | 472.87 |
| $Li_{1.5}Nb_{0.05}Mn_{0.8-y}TM_yO_2$ | .05 | Cr | 186.7 | 537.9 |
|  | 0.2 |  | 173.8 | 464.63 |
| $Li_{1.5}Nb_{0.05}Mn_{0.8-y}TM_yO_2$ | .05 | Sb | 322.1 | 996.7 |
|  | 0.2 |  | 161.76 | 412.03 |
| $Li_{1.5}Nb_{0.05}Mn_{0.8-y}TM_yO_2$ | .05 | Al | 149.9 | 440.5 |
|  | 0.2 |  | 175.6 | 479.15 |

Figure 4:
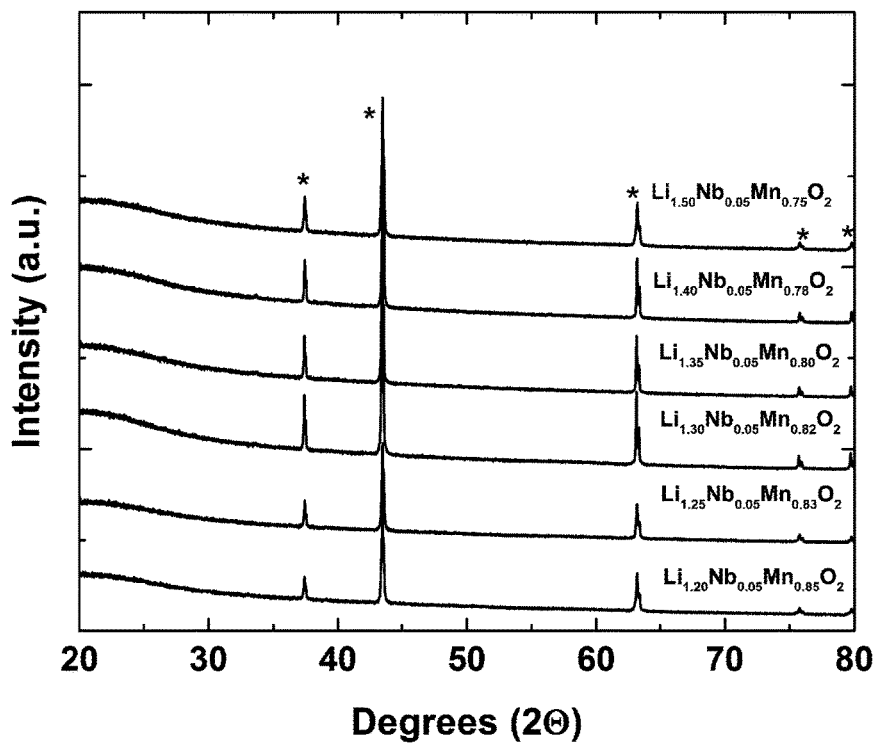
FIG. 4 illustrates a series of x-ray diffraction patterns of certain embodiments of the invention, where the stoichiometric lithium content is increased from 1.2 to 1.65 and the stoichiometric manganese content is decreased from 0.83 to 0.70.

FIG. 4 illustrates a series of x-ray diffraction patterns of certain embodiments of the invention, where the stoichiometric lithium content is increased from 1.2 to 1.65 and the stoichiometric manganese content is decreased from 0.85 to 0.70. The (*) symbol denotes the Fm-3m rock salt crystallographic structure.

Figure 5A:
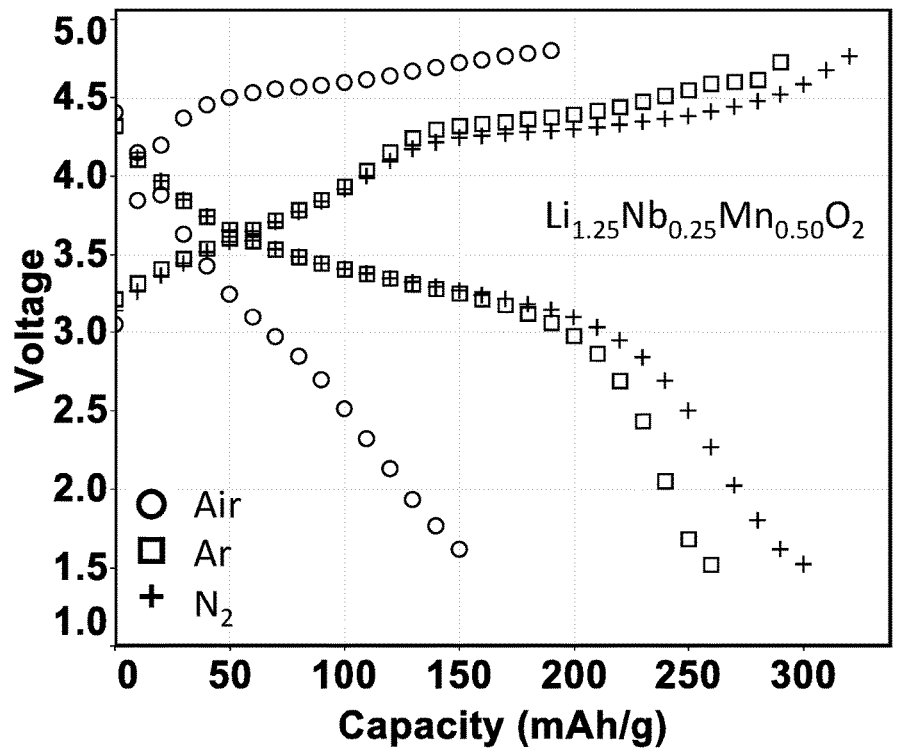
FIG. 5A illustrates electrochemical characterization of batteries including certain embodiments of the invention, where first cycle performance is measured for annealing of the disordered rock salt composition in various atmospheres at 1000 degrees Celsius.
Figure 5B:
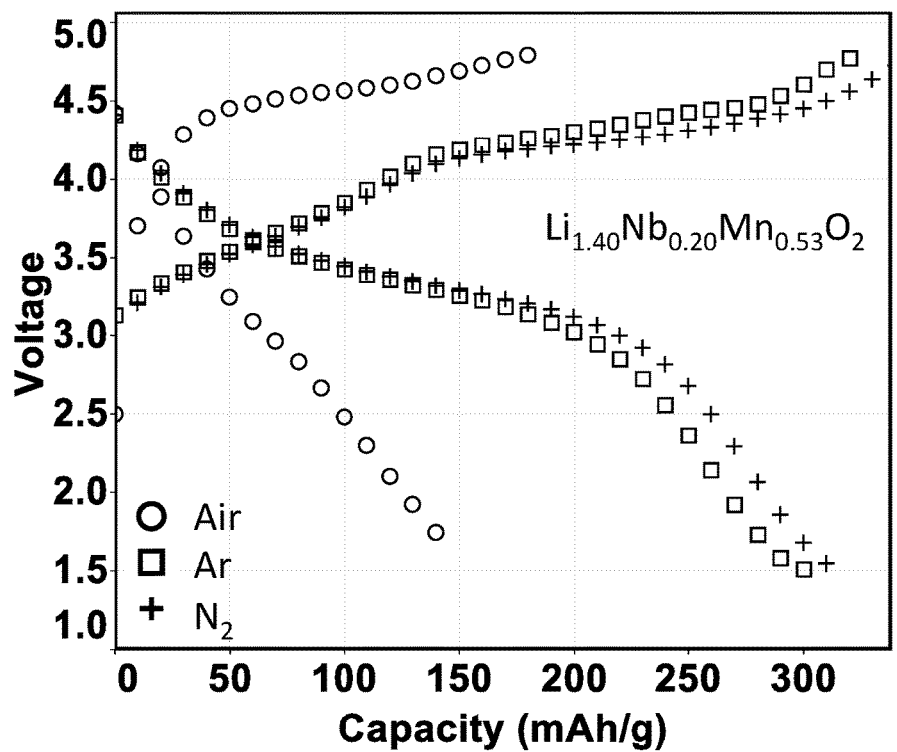
FIG. 5B illustrates electrochemical characterization of batteries including certain embodiments of the invention, where first cycle performance is measured for annealing of the disordered rock salt composition in various atmospheres at 1000 degrees Celsius.

FIG. 5A illustrates electrochemical characterization of batteries including certain embodiments of the invention, where first cycle performance is measured for annealing of the disordered rock salt composition in various atmospheres at 1000 degrees Celsius. FIG. 5B illustrates electrochemical characterization of batteries including certain embodiments of the invention, where first cycle performance is measured for annealing of the disordered rock salt composition in various atmospheres at 1000 degrees Celsius. In two different systems, the basic disordered rock salt composition of $Li_{1.25}Nb_{0.25}Mn_{0.50}O_2$ and the higher lithium content composition of $Li_{1.4}Nb_{0.2}Mn_{0.53}O_2$, the nitrogen atmosphere provided an increase in the first cycle performance.

Figure 6A:
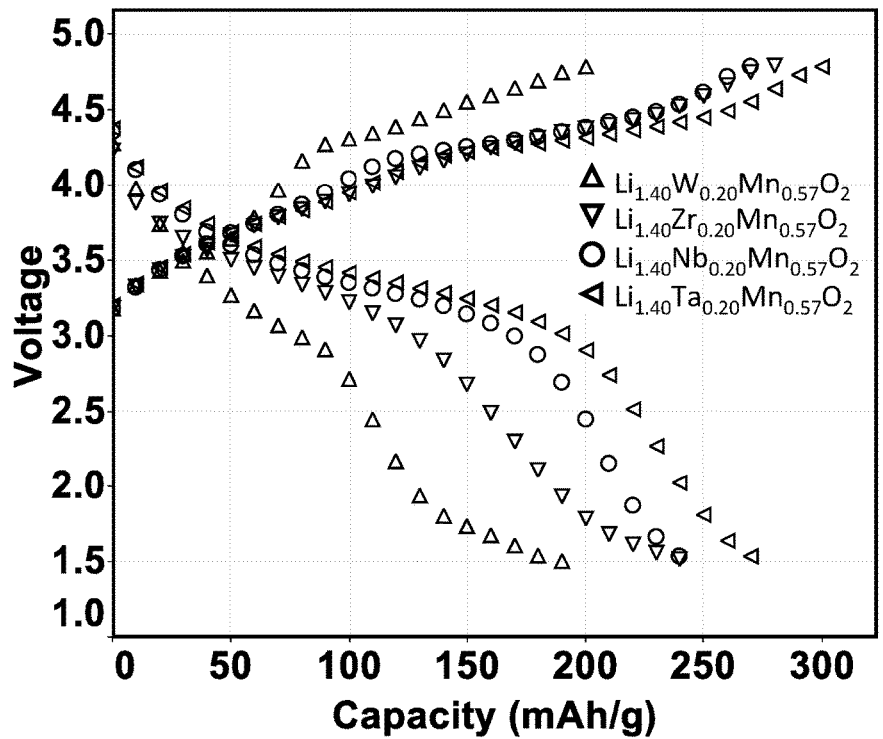
FIG. 6A illustrates electrochemical characterization of batteries including certain embodiments of the invention, where first cycle performance is measured for disordered rock salt compositions with various substitutions for the niobium in the composition.
Figure 6B:
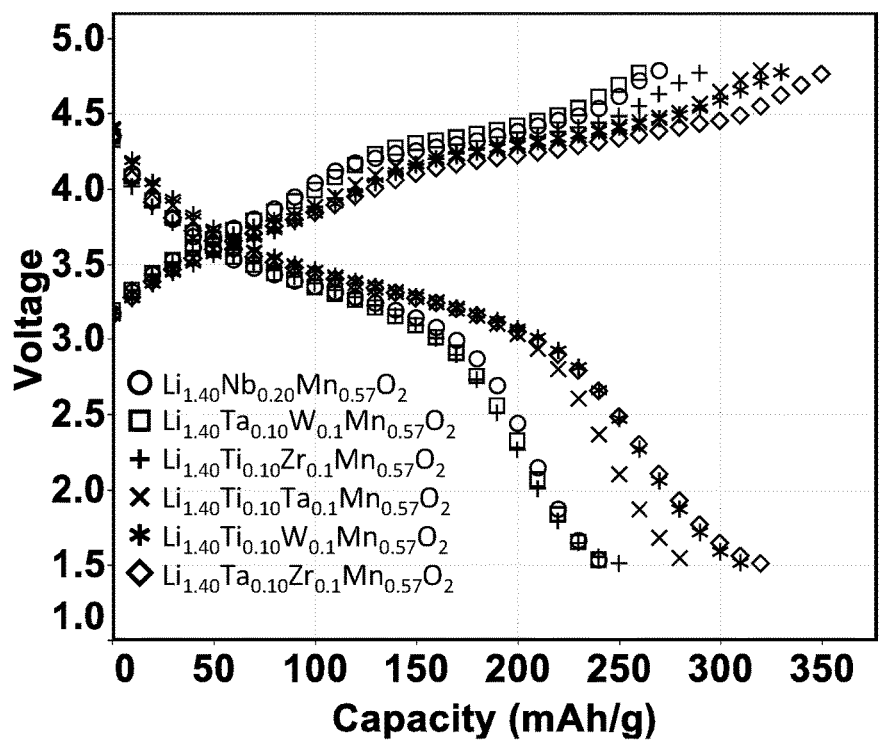
FIG. 6B illustrates electrochemical characterization of batteries including certain embodiments of the invention, where first cycle performance is measured for disordered rock salt compositions with various double dopants substitutions for the niobium in the composition.

FIG. 6A illustrates electrochemical characterization of batteries including certain embodiments of the invention, where first cycle performance is measured for disordered rock salt compositions with various substitutions for the niobium in the composition. FIG. 6B illustrates electrochemical characterization of batteries including certain embodiments of the invention, where first cycle performance is measured for disordered rock salt compositions with various double dopants substitutions for the niobium in the composition.

FIG. 6A illustrates an improvement when tantalum is substituted for niobium and FIG. 6B demonstrates that several double substitutions, including combinations of tantalum, tungsten, titanium, and zirconium, provide improvements in first cycle performance.

Figure 7A:
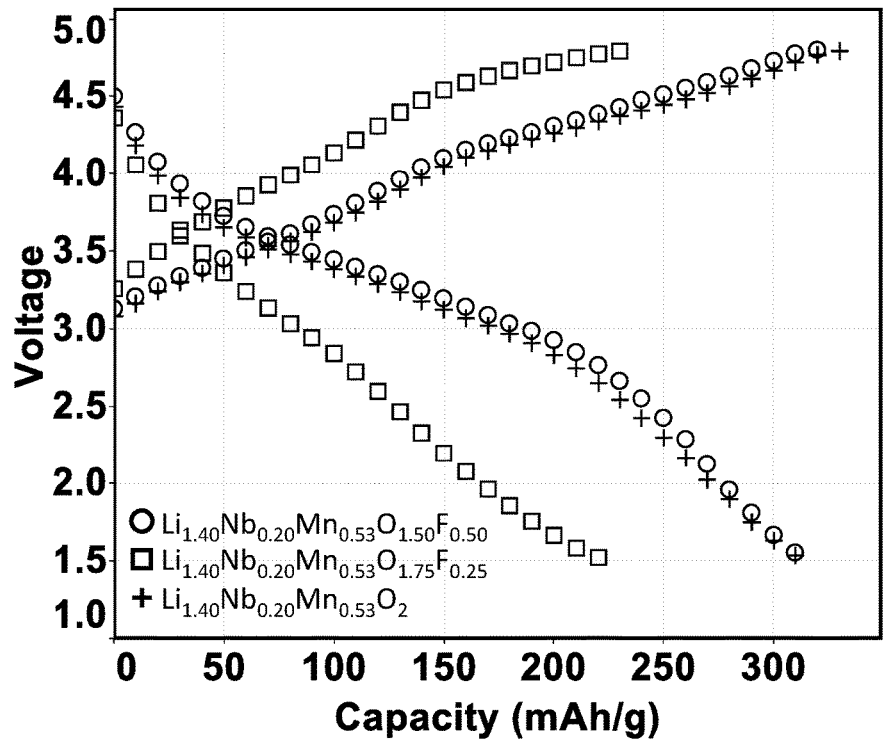
FIG. 7A illustrates electrochemical characterization of batteries including certain embodiments of the invention, where first cycle performance is measured for disordered rock salt compositions with fluorine doping onto the oxygen site.
Figure 7B:
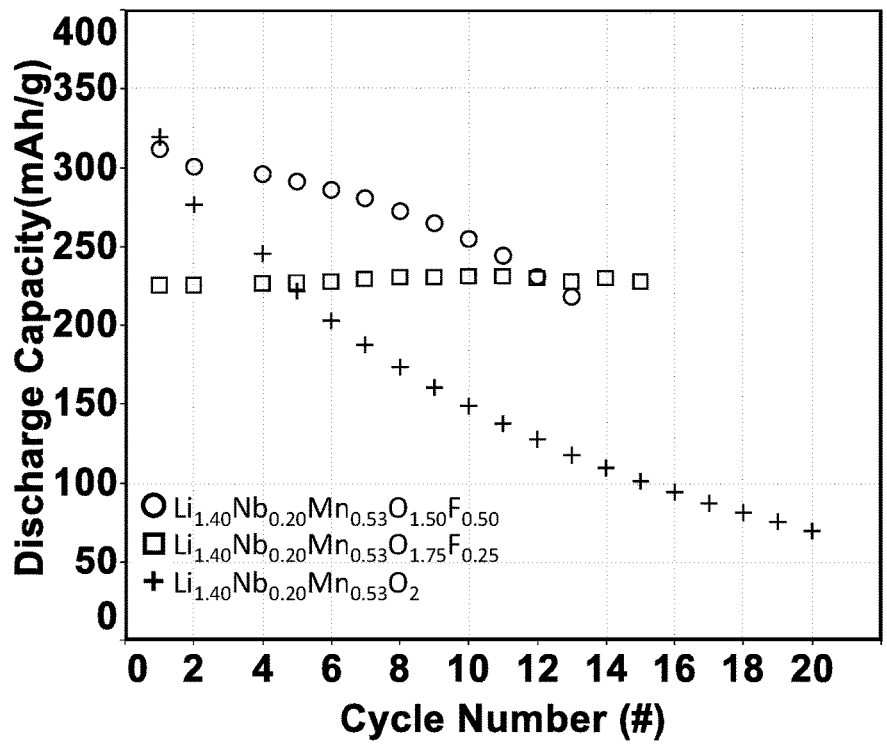
FIG. 7B illustrates the corresponding discharge capacity as a function of cycle number for the embodiments of the invention of FIG. 2A.

FIG. 7A illustrates electrochemical characterization of batteries including certain embodiments of the invention, where first cycle performance is measured for disordered rock salt compositions with fluorine doping onto the oxygen site. FIG. 7B illustrates the corresponding discharge capacity as a function of cycle number for the embodiments of the invention of FIG. 2A. FIG. 7A illustrates that fluorine doping at the oxygen site improves the first cycle performance and 7B illustrates performance improvement for fluorine doping at the oxygen site at higher cycles as well.

Embodiments disclosed herein are capable of, and in certain cases have demonstrated, improved capacity, energy density, voltage fade, rate performance, and capacity retention. The compositions disclosed herein demonstrate superior performance compared to the base disordered rock salt composition.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A battery, comprising:
  an electrode, comprising:
    an active material characterized by an Fm-3m disordered rock salt crystallographic structure and represented by the chemical formula (i):

$Li_xNb_{y-a}N_aM_{z-b}P_bO_{2-c}F_c$ where $1.30 < x \leq 1.75$; $0 \leq y < 0.55$; $0.1 < z < 1$; $0 \leq a < 0.5$; $0 \leq b < 1$; $0 \leq c < 0.8$; wherein at least one of y, a, and b is non-zero; M, N, and P are each independently one or more of Ti, Ta, V, Cr, Mn, Fe, Co, Ni, Cu, Zn, Al, Zr, Y, Mo, Ru, Rh, and Sb;
  and wherein the battery is characterized by a discharge capacity in the range of 266 mAh/g to 355 mAh/g when cycled between 4.8 V and 1.5 V at a C-rate of C/40.

2. The battery of claim 1, wherein $x \geq 1.35$.
3. The battery of claim 1, wherein $x \geq 1.45$.
4. The battery of claim 1, wherein $x \geq 1.55$.
5. The battery of claim 1, wherein $x \geq 1.65$.
6. The battery of claim 1, wherein $x = 1.75$.
7. The battery of claim 1, wherein $a=0$, $b=0$, and $1 \leq z/y \leq 18$.
8. The battery of claim 7, wherein $z/y=2$.
9. The battery of claim 7, wherein $z/y=4$.
10. The battery of claim 7, wherein $z/y=14$.
11. The battery of claim 7, wherein $z/y=16.6$.
12. The battery of claim 1, wherein only one of a or b is equal to zero.
13. The battery of claim 12, wherein $y=0.5$, $a=0$, $z=0.8$, $0<b<0.8$, M is manganese, and P is selected from Fe, Cr, Al, and Sb.
14. The battery of claim 12, wherein $y=0.2$, $0<a<0.2$, $z=0.57$, $b=0$, and N is selected from V, Mo, Sb, Ta, Ti, Zr, and Y.
15. The battery of claim 1, wherein $y-a=0$.
16. The battery of claim 1, wherein $0<c<0.8$.

* * * * *